(12) United States Patent
Jiang et al.

(10) Patent No.: US 12,499,251 B2
(45) Date of Patent: Dec. 16, 2025

(54) STATISTICAL MEASUREMENT WITH ACTIVE LEARNING FOR PRIVACY PROTECTION EVALUATION

(71) Applicant: Lemon Inc., Grand Cayman (KY)

(72) Inventors: Bo Jiang, Culver City, CA (US); Jian Du, Culver City, CA (US); Qiang Yan, Beijing (CN)

( * ) Notice: Subject to any disclaimer, the term of this patent is extended or adjusted under 35 U.S.C. 154(b) by 181 days.

(21) Appl. No.: 18/363,823

(22) Filed: Aug. 2, 2023

(65) Prior Publication Data

US 2025/0045425 A1 Feb. 6, 2025

(51) Int. Cl.
*G06F 21/60* (2013.01)

(52) U.S. Cl.
CPC .................. *G06F 21/604* (2013.01)

(58) Field of Classification Search
CPC ........ G06F 17/18; G06F 21/577; G06F 21/60; G06F 21/602; G06F 21/604; G06F 21/6245; G06F 21/6254
See application file for complete search history.

(56) References Cited

U.S. PATENT DOCUMENTS

| | | | | |
|---|---|---|---|---|
| 2003/0101028 A1* | 5/2003 | Banks | ..................... | G06F 17/18 |
| | | | | 702/189 |
| 2011/0045525 A1* | 2/2011 | Krockenberger | ...... | G01N 33/48 |
| | | | | 435/288.7 |

OTHER PUBLICATIONS

"Estimating Set Intersection using Small Samples", In Proceedings of the Thirty-Third Australasian Conference on Computer Science—vol. 102 (ACSC '10), vol. 102. Australian Computer Society, Inc., AUS, 71-78. (Year: 2010).*

* cited by examiner

*Primary Examiner* — Kevin Bechtel
(74) *Attorney, Agent, or Firm* — Fish & Richardson P.C.

(57) ABSTRACT

Methods and systems for evaluating privacy protection are provided. A method includes determining a first sub-dataset of a first dataset based on a sampling rate, a tolerance, and a first threshold. The method also includes determining a second sub-dataset of the first dataset based on the sampling rate, the tolerance, and a second threshold. The method includes determining a first distance between the first sub-dataset and the first threshold, determining a second distance between the second sub-dataset and the second threshold, generating a first intersection of the first sub-dataset and a second dataset and updating posterior for elements of the first dataset based on the first intersection when the first distance is less than or equal to the second distance, and determining positive membership and negative membership for the elements of the first dataset in the second dataset based on the posterior for the elements of the first dataset.

20 Claims, 5 Drawing Sheets

STATISTICAL MEASUREMENT WITH ACTIVE LEARNING FOR PRIVACY PROTECTION EVALUATION

FIELD

The embodiments described herein pertain generally to evaluating the effectiveness of a privacy protection protocol or algorithm. More specifically, the embodiments described herein pertain to a statistical measurement with active learning for evaluating the effectiveness of a privacy protection protocol or algorithm.

BACKGROUND

Private set intersection (PSI) is one of secure two- or multi-party protocols or algorithms by which intersection-related statistics are computed, and PSI has garnered significant industry interest. PSI algorithms or protocols permit two or more organizations to jointly compute a function (e.g., count, sum, etc.) over the intersection of their respective data sets without revealing to other party the intersection explicitly. In an application, two parties may be unwilling or unable to reveal the underlying data to each other, but they may still want to compute an aggregate population-level measurement. The two parties may want to do so while ensuring that the input data sets reveal nothing beyond these aggregate values about individual users. It is to be understood that a protocol or algorithm that discloses the size, count, or cardinality of the intersection of the data sets of two parties to one or both of the two parties may be referred to as an intersection-size-revealing protocol or algorithm.

SUMMARY

Features in the embodiments disclosed herein provide a privacy protection effectiveness evaluation protocol, algorithm, method, and/or system for intersection-size-revealing protocols. Features in the embodiments disclosed herein adopt a statistical measurement with active learning approach, enhance and improve the privacy protection and/or privacy protection effective evaluation technology or technical field by, e.g., acknowledging the roles of both positive membership and negative membership during the membership inference process, broadening the scope of data considered, improving efficiency while making negligible compromises on inference accuracy, maintaining effectiveness against counterattack privacy protection mechanisms, thereby providing a robust means to critically examine the privacy assurances offered by such mechanisms, providing a more comprehensive privacy evaluation solution under a limited protocol run times, and providing an efficient quantitative evaluation of the effectiveness of privacy protection in the set intersection operations, etc.

It is to be understood that some set membership inference attacks or evaluation mechanisms may treat each individual's membership as deterministic values (e.g., dichotomizing them into either positive or negative memberships with deterministic values). Such deterministic mechanisms may be plagued by low inference efficiency and vulnerability to noise-introducing privacy-preserving mechanisms, such as differential privacy. The inefficiency is in the deterministic mechanism's rigid approach, which may infer when the mechanism has a high certainty about an individual's membership. For instance, such mechanism may proceed with an inference if the cardinality of the privacy protection protocol's one input dataset is "N", and the protocol's return (of the number of positive or negative membership) is either "N" or 0, which signifies that all individuals in the input dataset are either positive or negative members. Thus, when randomness is incorporated into the outcome (e.g., of the set intersection, etc.), the deterministic mechanism's "inference stopping" rule may be invalid, effectively thwarting the evaluation. Features in the embodiments disclosed herein provide a robust statistical evaluation algorithm, utilize Bayesian inference methods to efficiently determine each individual's membership, and allow for more nuanced reasoning that surpasses the binary constraints of existing mechanisms.

In one example embodiment, a method for evaluating privacy protection is provided. The method includes determining a first sub-dataset of a first dataset based on a sampling rate, a tolerance, and a first threshold. The method also includes determining a second sub-dataset of the first dataset based on the sampling rate, the tolerance, and a second threshold. The method further includes determining a first distance between the first sub-dataset and the first threshold, determining a second distance between the second sub-dataset and the second threshold, generating a first intersection of the first sub-dataset and a second dataset and updating posterior for elements of the first dataset based on the first intersection when the first distance is less than or equal to the second distance, and determining positive membership and negative membership for the elements of the first dataset in the second dataset based on the posterior for the elements of the first dataset.

In another example embodiment, a privacy protection evaluation system is provided. The system includes a processor and a memory to store a first dataset, a sampling rate, a tolerance, a first threshold, and a second threshold. The processor is to determine a first sub-dataset of the first dataset based on the sampling rate, the tolerance, and the first threshold. The processor is also to determine a second sub-dataset of the first dataset based on the sampling rate, the tolerance, and the second threshold. The processor is further to determine a first distance between the first sub-dataset and the first threshold, determine a second distance between the second sub-dataset and the second threshold, generate a first intersection of the first sub-dataset and a second dataset and update posterior for elements of the first dataset based on the first intersection when the first distance is less than or equal to the second distance, and determine positive membership and negative membership for the elements of the first dataset in the second dataset based on the posterior for the elements of the first dataset.

In yet another example embodiment, a non-transitory computer-readable medium having computer-executable instructions stored thereon is provided. The instructions, upon execution, cause one or more processors to perform operations including determining a first sub-dataset of a first dataset based on a sampling rate, a tolerance, and a first threshold. The operations also include determining a second sub-dataset of the first dataset based on the sampling rate, the tolerance, and a second threshold. The operations further include determining a first distance between the first sub-dataset and the first threshold, determining a second distance between the second sub-dataset and the second threshold, generating a first intersection of the first sub-dataset and a second dataset and updating posterior for elements of the first dataset based on the first intersection when the first distance is less than or equal to the second distance, and determining positive membership and negative membership for the elements of the first dataset in the second dataset based on the posterior for the elements of the first dataset.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Non-limiting and non-exhaustive descriptions are described with reference to the following drawings. The components in the figures are not necessarily to scale, emphasis instead being placed upon illustrating principles. In the detailed description that follows, embodiments are described as illustrations only since various changes and modifications may become apparent to those skilled in the art from the following detailed description.

DETAILED DESCRIPTION

Figure 1:
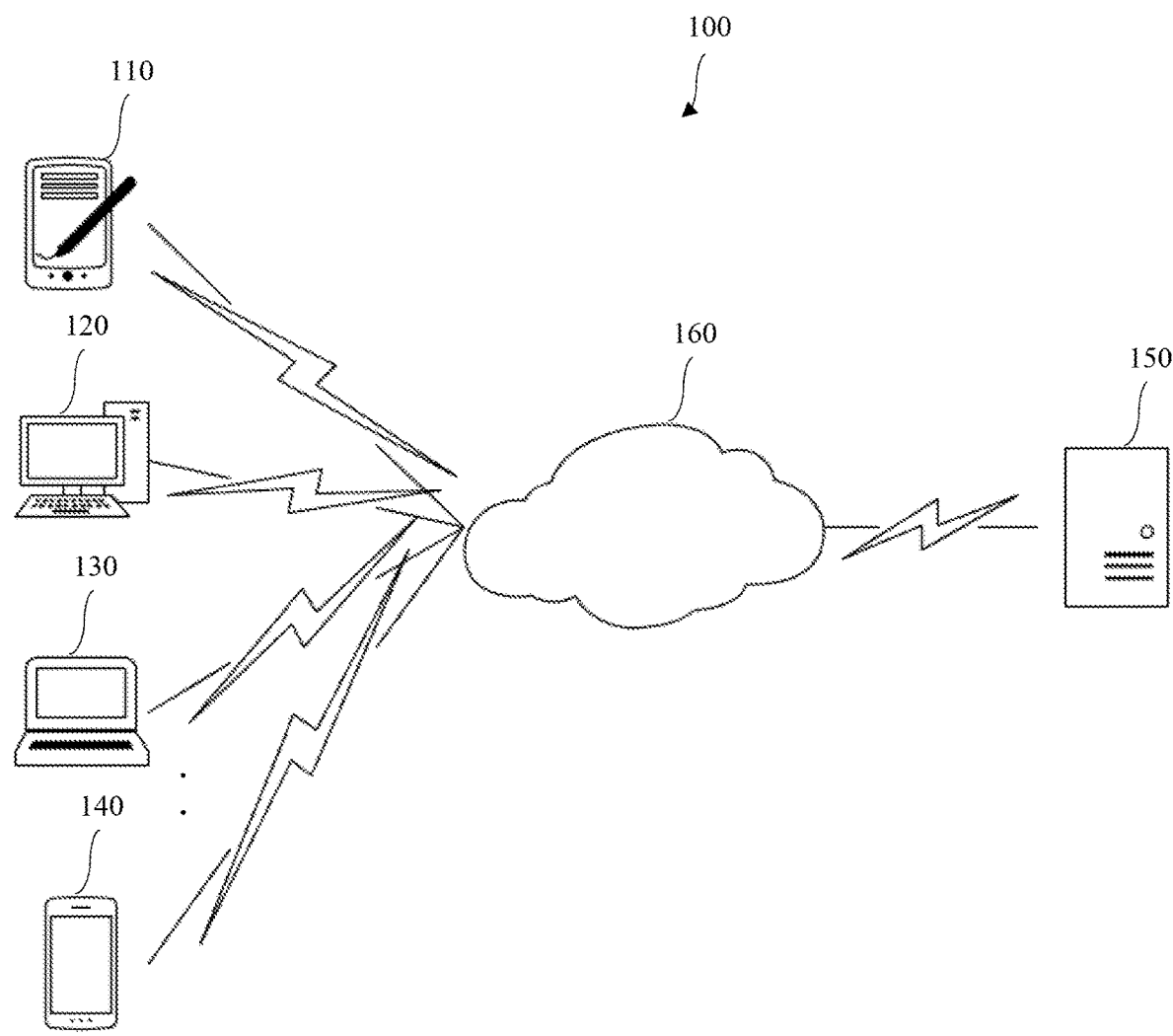
FIG. 1 is a schematic view of an example privacy protection effectiveness evaluation system, arranged in accordance with at least some embodiments described herein.

In the following detailed description, particular embodiments of the present disclosure are described herein with reference to the accompanying drawings, which form a part of the description. In this description, as well as in the drawings, like-referenced numbers represent elements that may perform the same, similar, or equivalent functions, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

It is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Additionally, the present disclosure may be described herein in terms of functional block components and various processing steps. It should be appreciated that such functional blocks may be realized by any number of hardware and/or software components configured to perform the specified functions.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential".

As referenced herein, a "data set" or "dataset" is a term of art and may refer to an organized collection of data stored and accessed electronically. In an example embodiment, a dataset may refer to a database, a data table, a portion of a database or data table, etc. It is to be understood that a dataset may correspond to one or more database tables, of which every column of a database table represents a particular variable or field, and each row of the database table corresponds to a given record of the dataset. The dataset may list values for each of the variables, and/or for each record of the dataset. It is also to be understood that a dataset may also or alternatively refer to a set of related data and the way the related data is organized. In an example embodiment, each record of a dataset may include field(s) or element(s) such as one or more predefined or predetermined identifications (e.g., membership identifications, user identifications, etc., such as user's name, e-mail address, phone numbers, user's unique ID, etc.), and/or one or more attributes or features or values associated with the one or more identifications. It is to be understood that any user's identification(s) and/or user's data described in this document are allowed, permitted, and/or otherwise authorized by the user for use in the embodiments described herein and in their proper legal equivalents as understood by those of skill in the art. It is also to be understood that a size, count, or cardinality of a dataset may refer to the number of records (or rows, elements, etc.) of the dataset.

As referenced herein, "inner join" or "inner-join" is a term of art and may refer to an operation or function that includes combining records from datasets, particularly when there are matching values in a field common to the datasets. For example, an inner join may be performed with a "Departments" dataset and an "Employees" dataset to determine all the employees in each department. It is to be understood that in the resulting dataset (i.e., the "intersection") of the inner join operation, the inner join may contain the information from both datasets that is related to each other. An outer join, on the other hand, may also contain information that is not related to the other dataset in its resulting dataset. A private inner join may refer to an inner join operation of datasets of two or more parties that does not reveal the data in the intersection of datasets of the two or more parties.

As referenced herein, "set intersection" or "intersection" (of two datasets A and B) is a term of art in the set theory and may refer to a dataset containing all elements or records of A that also belong to B or equivalently, all elements or records of B that also belong to A. That is, the intersection (denoted by A∩B) of datasets A and B may refer to a set of all elements or records that are members of both the datasets A and B. For example, x is an element or record of the intersection of datasets A and B if and only if x is both an element (or record) of A and an element (or record) of B. For example, the intersection of the datasets A (e.g., {1, 2, 3}) and B (e.g., {2, 3, 4}) is e.g., the dataset {2, 3}. It is to be understood that a "set intersection" operation or "intersection" operation (e.g., an inner join operation, etc.) may refer to an operation, protocol, or algorithm to obtain, determine, or identify the intersection of two datasets.

As referenced herein, a "positive membership" of an element or record in a dataset (or with respect to the dataset) may refer to a status of an element or record being a member of the dataset. That is, a positive membership of an element or record in a dataset (or with respect to the dataset) may indicate that the element or record belongs to the dataset or is a member of the dataset. As referenced herein, a "negative membership" of an element or record in a dataset (or with respect to the dataset) may refer to a status of an element or record not being a member of the dataset. That is, a negative membership of an element or record in a dataset (or with respect to the dataset) may indicate that the element or record does not belong to the dataset or is not a member of the dataset. In the example that the intersection of the datasets A (e.g., {1, 2, 3}) and B (e.g., {2, 3, 4}) is e.g., the dataset {2, 3}, the elements "1", "2", and "3" have positive membership in or with respect to dataset A, and the element "4" has negative membership in or with respect to dataset A. The elements "2", "3", and "4" have positive membership in or with respect to dataset B, and the element "1" has negative membership in or with respect to dataset B. The elements "2" and "3" of the intersection have positive membership in or with respect to both dataset A and dataset B.

As referenced herein, a "leakage" or "privacy leakage" may refer to a disclosure or revealing of information that is supposed to be protected by e.g., a privacy protection protocol or algorithm. A membership leakage may refer to a disclosure or revealing of the positive membership and/or the negative membership of an element or record in or with respect to a dataset. It is to be understood that the leakage can be quantified using suitable mechanisms. An expected leakage may refer to a quantified leakage based on a probability distribution of the leakage.

As referenced herein, "private set intersection" is a term of art and may refer to a secure multi-party computation cryptographic operation, algorithm, or function by which two or more parties holding respective datasets compare encrypted versions of these datasets in order to compute the intersection. It is to be understood that for private set intersection, neither party reveals data elements to the counterparty except for e.g., the aggregated data of the elements in the intersection.

As referenced herein, "MPC" or "multi-party computation" is a term of art and may refer to a field of cryptography with the goal of creating schemes for parties to jointly compute a function over the joint input of the parties while keeping respective input private. It is to be understood that, unlike traditional cryptographic tasks where cryptography may assure security and integrity of communication or storage when an adversary is outside the system of participants (e.g., an eavesdropper on the sender and/or the receiver), the cryptography in MPC may protect participants' privacy relative to each other.

As referenced herein, "Bayesian inference" or "Bayesian probability" is term of art in statistics and may refer to a statistical inference in which Bayes' theorem may be used to update (i.e., Bayesian updating) the probability for a hypothesis as more evidence or information becomes available. Bayesian updating may be used in the dynamic analysis of a sequence of data.

As referenced herein, "prior", "prior belief", or "prior probability" is term of art in statistics and may refer to a probability distribution representing knowledge or uncertainty of a data object prior or before observing it. It is to be understood that a prior probability distribution of an uncertain quantity is its assumed probability distribution before some evidence is taken into account. For example, the prior can be the probability distribution representing the relative proportions of voters who will vote for a particular official in an election. The unknown quantity may be a parameter of the model or a latent variable rather than an observable variable. In Bayesian inference, Bayes' rule prescribes how to update the prior with new information to obtain the posterior probability distribution, which is the conditional distribution of the uncertain quantity given new data.

As referenced herein, "posterior", "posterior belief", or "posterior probability" is term of art in statistics and may refer to a conditional probability distribution representing what parameters are likely after observing the data object. It is to be understood that in Bayesian inference, a posterior probability may be a type of conditional probability that results from updating the prior probability with information summarized by the likelihood via an application of Bayes' rule. The posterior probability may contain everything there is to know about an uncertain proposition (e.g., a scientific hypothesis, parameter values, etc.), given prior knowledge and a mathematical model describing the observations available at a particular time. After the arrival of new information, the current posterior probability may serve as the prior in next round of Bayesian updating.

FIG. 1 is a schematic view of an example privacy protection effectiveness evaluation system 100, arranged in accordance with at least some embodiments described herein.

The system 100 may include terminal devices 110, 120, 130, and 140, a network 160, and a server 150. It is to be understood that FIG. 1 only shows illustrative numbers of the terminal devices, the network, and the server. The embodiments described herein are not limited to the number of the terminal devices, the network, and/or the server described. That is, the number of terminal devices, networks, and/or servers described herein are provided for descriptive purposes only and are not intended to be limiting.

In accordance with at least some example embodiments, the terminal devices 110, 120, 130, and 140 may be various electronic devices. The various electronic devices may include but not be limited to a mobile device such as a smartphone, a tablet computer, an e-book reader, a laptop computer, a desktop computer, and/or any other suitable electronic devices.

In accordance with at least some example embodiments, the network 160 may be a medium used to provide a communications link between the terminal devices 110, 120, 130, 140 and the server 150. The network 160 may be the Internet, a local area network (LAN), a wide area network (WAN), a local interconnect network (LIN), a cloud, etc.

The network 160 may be implemented by various types of connections, such as a wired communications link, a wireless communications link, an optical fiber cable, etc.

In accordance with at least some example embodiments, the server 150 may be a server for providing various services to users using one or more of the terminal devices 110, 120, 130, and 140. The server 150 may be implemented by a distributed server cluster including multiple instances of server 150 or may be implemented by a single server 150.

A user may use one or more of the terminal devices 110, 120, 130, and 140 to interact with the server 150 via the network 160. Various applications or localized interfaces thereof, such as social media applications, online shopping services, privacy protection effectiveness evaluation applications or the like, may be installed on the terminal devices 110, 120, 130, and 140.

It is to be understood that software applications or services according to the embodiments described herein and/or according to the services provided by the service providers may be performed by the server 150 and/or the terminal devices 110, 120, 130, and 140 (which may be referred to herein as user devices). Accordingly, the apparatus for the software applications and/or services may be arranged in the server 150 and/or in the terminal devices 110, 120, 130, and 140.

It is also to be understood that when a service is not performed remotely, the system 100 may not include the network 160, but include only the terminal device 110, 120, 130, and 140 and/or the server 150.

It is further to be understood that the terminal device 110, 120, 130, and 140 and/or the server 150 may each include one or more processors, a memory, and a storage device storing one or more programs. The terminal device 110, 120, 130, and 140 and/or the server 150 may also each include an Ethernet connector, a wireless fidelity receptor, etc. The one or more programs, when being executed by the one or more processors, may cause the one or more processors to perform the method(s) described in any embodiments described herein. Also, it is to be understood that a computer readable non-volatile medium may be provided according to the embodiments described herein. The computer readable medium stores computer programs. The computer programs are used to, when being executed by a processor, perform the method(s) described in any embodiments described herein.

Figure 2A:
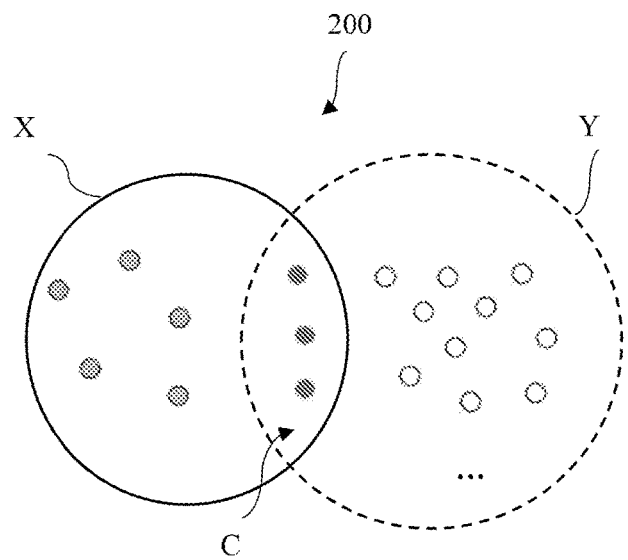
FIG. 2A is a schematic diagram illustrating an example of a set intersection operation, in accordance with at least some embodiments described herein.
Figure 2B:
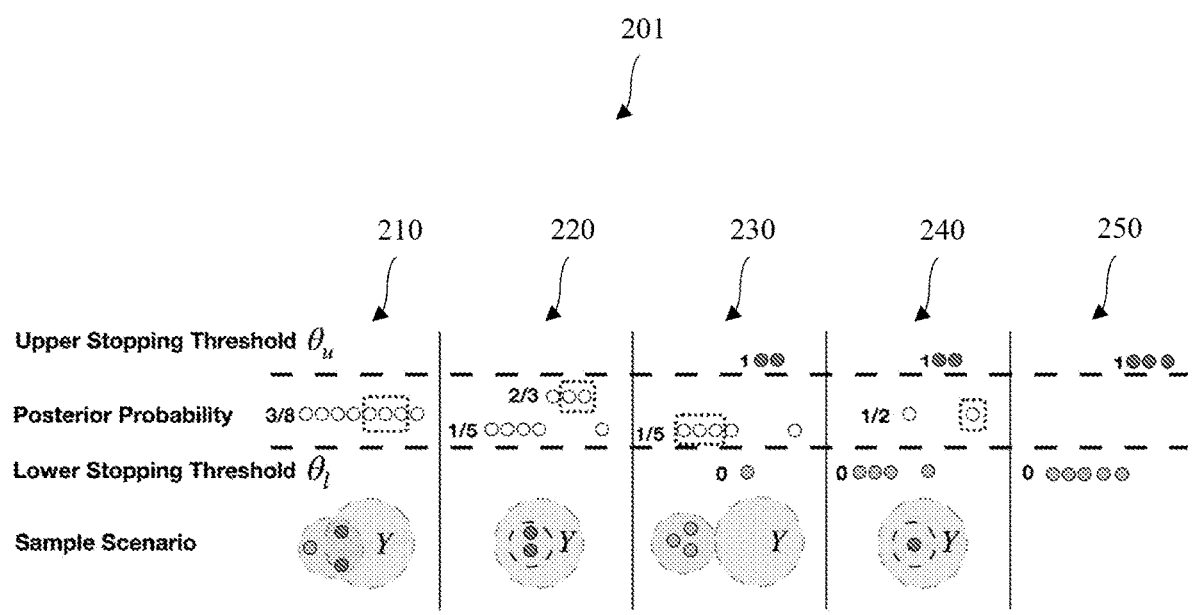
FIG. 2B is a schematic diagram illustrating an example of processing stages or steps of a privacy protection effectiveness evaluation algorithm, in accordance with at least some embodiments described herein.

FIG. 2A is a schematic diagram 200 illustrating an example of a set intersection operation, in accordance with at least some embodiments described herein. FIG. 2B is a schematic diagram 201 illustrating an example of processing stages or steps of a privacy protection effectiveness evaluation algorithm, in accordance with at least some embodiments described herein.

Figure 6:
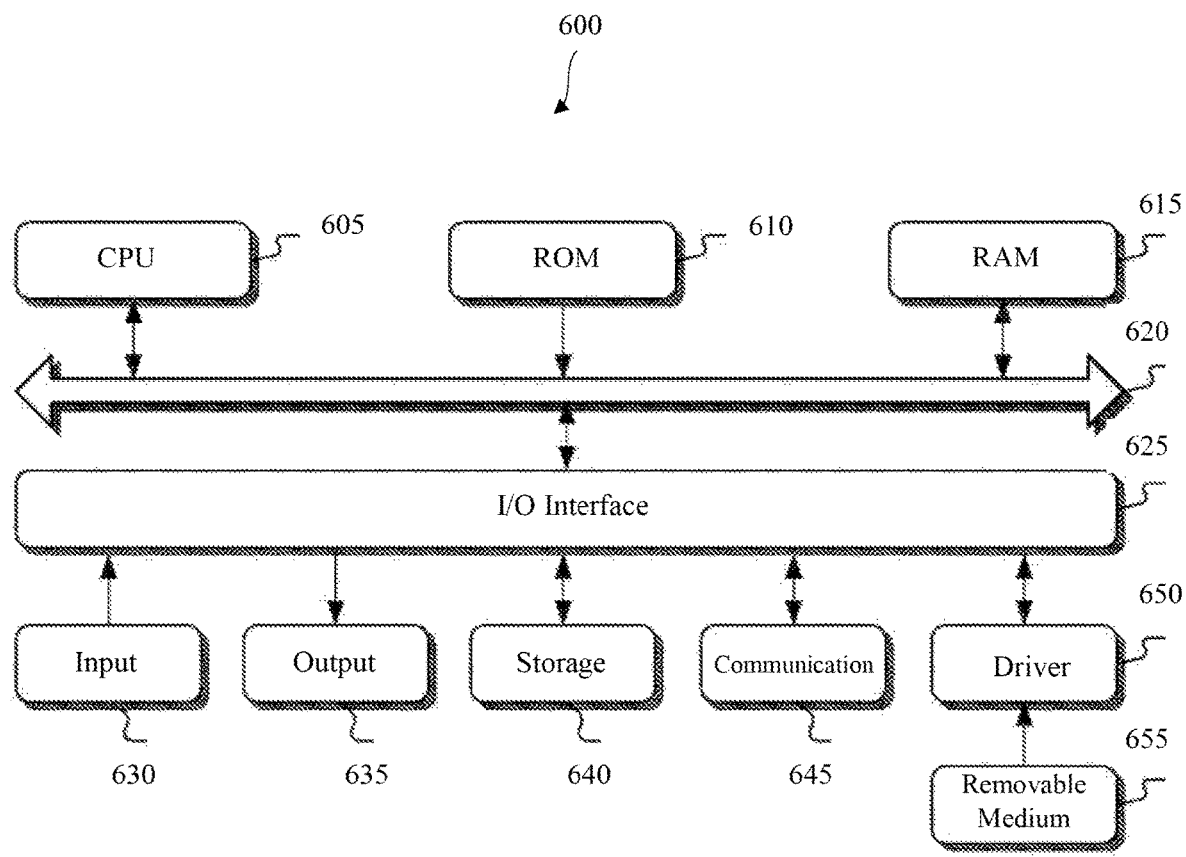
FIG. 6 is a schematic structural diagram of an example computer system applicable to implementing an electronic device, arranged in accordance with at least some embodiments described herein.

It is to be understood that the processing steps of the diagrams 200 and 201 disclosed herein can be conducted by one or more processors (e.g., the processor of one or more of the terminal device 110, 120, 130, and 140 of FIG. 1, the processor of the server 150 of FIG. 1, the central processor unit 605 of FIG. 6, and/or any other suitable processor), unless otherwise specified.

As shown in FIG. 2A, Party A has a dataset X and Party B has a dataset Y. It is to be understood that the format, content, and/or arrangement of the datasets described herein are for descriptive purposes only and are not intended to be limiting.

In an example embodiment, the dataset X includes eight elements or records $\{x1, x2, x3, x4, x5, c1, c2, c3\}$. The dataset Y includes three or more elements or records $\{c1, c2, c3, y1, y2, y3, y4, y5 \ldots\}$. A set intersection operation (e.g. a PSI, an MPC based PSI, etc.) of the dataset X and the dataset Y may be performed, and the resultant intersection (a dataset C) of the dataset X and the dataset Y includes three elements $\{c1, c2, c3\}$. It is to be understood that PSI and/or MPC based PSI algorithms or protocols may permit Party A and Party B to jointly compute a function (e.g., count, sum, etc.) over the intersection of datasets X and Y without revealing to either party the intersection explicitly. That is, the set intersection operation of the dataset X and the dataset Y may not reveal the intersection C to either party, but may disclose the size, count, or cardinality ("3" in this example) of the intersection C of the datasets X and Y to one or both parties, via e.g., an intersection-size-revealing protocol or algorithm.

It is to be understood that an intersection operation or a set intersection operation may refer to a fundamental operation that may be performed on large datasets in situations such as MPC based PSI operations, structured query language datasets/databases join operations, contact discovery, etc. It is also to be understood that when an intersection operation requires input datasets from two different data owners and/or parties, both parties may be required to compute the intersection of private datasets without disclosing data and/or user membership within each dataset. Many approaches may safeguard user privacy by permitting two parties to jointly compute a function (e.g., count, sum, average, etc.) over the intersection of their datasets without revealing this underlining intersection data, e.g., keep the set intersection in the ciphertext. It is to be understood that the cardinality of the intersection may be disclosed to one or both parties, via e.g., intersection-size-revealing protocols.

It is also to be understood that the intersection-size-revealing protocols may be subject to set membership inference attacks, i.e., the attacker (or evaluator), as one party of the intersection-size-revealing protocol, may eventually learn membership of any subsets of individuals/users/records from his party by continuously calling the intersection-size-revealing protocol. Membership may refer to a status whether an individual or user is within the dataset of one or the other party. It is further to be understood that attacking or evaluating a privacy protection protocol (such as an intersection-size-revealing protocol) may be used as a way to evaluate the effectiveness of such protocol. In real application, existing attacks may not be efficient enough, as most of dataset owners may only allow running the intersection-size-revealing protocol with their dataset for limited number of times during a fixed time interval. Under a certain (e.g., limited, predetermined, etc.) number of intersection-size-revealing protocol invocations, membership leakage caused by existing attack may be very small or zero, while the true privacy leakage caused by a potential more powerful attacker can be more significant. Features in the embodiments disclosed herein consider both positive membership leakage as well as negative membership information, and provide a more efficient privacy protection effectiveness evaluation method within the number of times limitation of running the intersection-size-revealing protocol.

It is further to be understood that a MPC based PSI operation may include one or more of the following processes: either party (Party A and/or Party B) may shuffle and encode (or encode and shuffle) its corresponding dataset X and/or Y. It is to be understood that shuffle or shuffling is a term of art and may refer to an action or algorithm for randomly rearranging the order of the records (elements, rows, etc.) of e.g., a dataset. Encode or encoding is a term of art and may refer to an action or algorithm e.g., for encrypting the records (elements, rows, etc.) or fields (attributes, columns, etc.) of e.g., a dataset based on e.g., an encryption algorithm or protocol. The parties may exchange their corresponding shuffled and encoded dataset with each other, shuffle and encode (or encode and shuffle) the exchanged dataset. The parties may exchange their corresponding resultant datasets (encoded by Party A and then encoded by Party B, or encoded by Party B and then encoded by Party A) with each other. That is, both Party A and Party B have the dataset X (that is encoded by both Party A and Party B) and the dataset Y (that is encoded by both Party A and Party B), but may not know the content of those datasets since each party may have its own encryption key to encode the dataset. Either or both party may perform an intersection operation based on the dataset X (that is encoded by both Party A and Party B) and the dataset Y (that is encoded by both Party A and Party B) to generate or obtain an intersection. The content of the intersection is unknown to neither party (since each party may have its own encryption key to encode the dataset, which may result in an unknown intersection), but the size, count, or cardinality of the intersection may be known to either or both parties. It is to be understood that the intersection may be used for further processing such as generating secret shares, gathering secret shares, and/or generating the results by combining gathered secret shares, etc. The MPC based PSI operation described above (that returns or reveals the cardinality of the intersection and/or only the cardinality of the intersection) may refer to a PSI-CA (Private Set Intersection-Cardinality) operation.

Referring back to FIG. 2A, a PSI operation such as a PSI-CA operation may be performed on the dataset X and the dataset Y, and the cardinality of the intersection (and only the cardinality of the intersection) C may be revealed to either or both parties. That is, after a PSI operation between the dataset X and the dataset Y, Party A may know that "3" out of the "8" elements or records (without knowing which "3" elements or records) in the dataset X may have positive membership in, or with respect to dataset Y, and "8−3=5" out of the "8" elements or records (without knowing which "5" elements or records) in the dataset X may have negative membership in or with respect to dataset Y.

FIG. 2B illustrates an example 201 of processing stages or steps of a privacy protection effectiveness evaluation algorithm, based on the cardinality of the intersection revealed in FIG. 2A. As described in FIG. 2A, it is known or revealed that the dataset X (of Party A) has 3 elements or records that have positive membership in or with respect to dataset Y, and 5 elements or records that have negative membership in or with respect to dataset Y, but it is not known which 3 members are positive members (i.e., elements have positive membership in dataset Y) and which 5 members are negative members (i.e., elements have negative membership in dataset Y). As shown in FIG. 2B, an upper threshold $\theta_u$ (e.g., the upper stopping threshold for stopping an evaluation iteration/process), a lower threshold $\theta_l$ (e.g., the lower stopping threshold for stopping an evaluation iteration/process), the updated posterior possibilities of the elements of the datasets (e.g., dataset X or subsets of dataset X, etc.), and the sample scenario of the PSI operation (between a selected sub-dataset as an input to the next PSI operation, and another input dataset Y) are provided. See description of FIGS. 3-5 for details.

At stage or step 210 of the privacy protection effectiveness evaluation algorithm 201, the posterior probability of each element of the original dataset X is updated from an initial value (i.e., the posterior probability before the PSI operation or the prior possibility initiated as e.g., a random variable 0.5, etc.) to 3/8 based on the cardinality of the intersection revealed in FIG. 2A, where 3 is the number of positive members (i.e., the cardinality 3 of the intersection revealed in FIG. 2A) of the original dataset X, 8 is the number of all members of the original dataset X. See description of FIGS. 4 and 5 for updating posterior probability. It is to be understood that $\tau$ (not shown) is the constraint (the maximum allowable number or remaining number of invocations of the intersection-size-revealing protocol such as a PSI operation), and that each time the processor conduct, invoke, execute, run, or perform a PSI operation on the input datasets, the processor may obtain, receive, or generate the cardinality of the resultant intersection, and decrease the constraint number $\tau$ by 1 ($\tau=\tau-1$).

Figure 3:
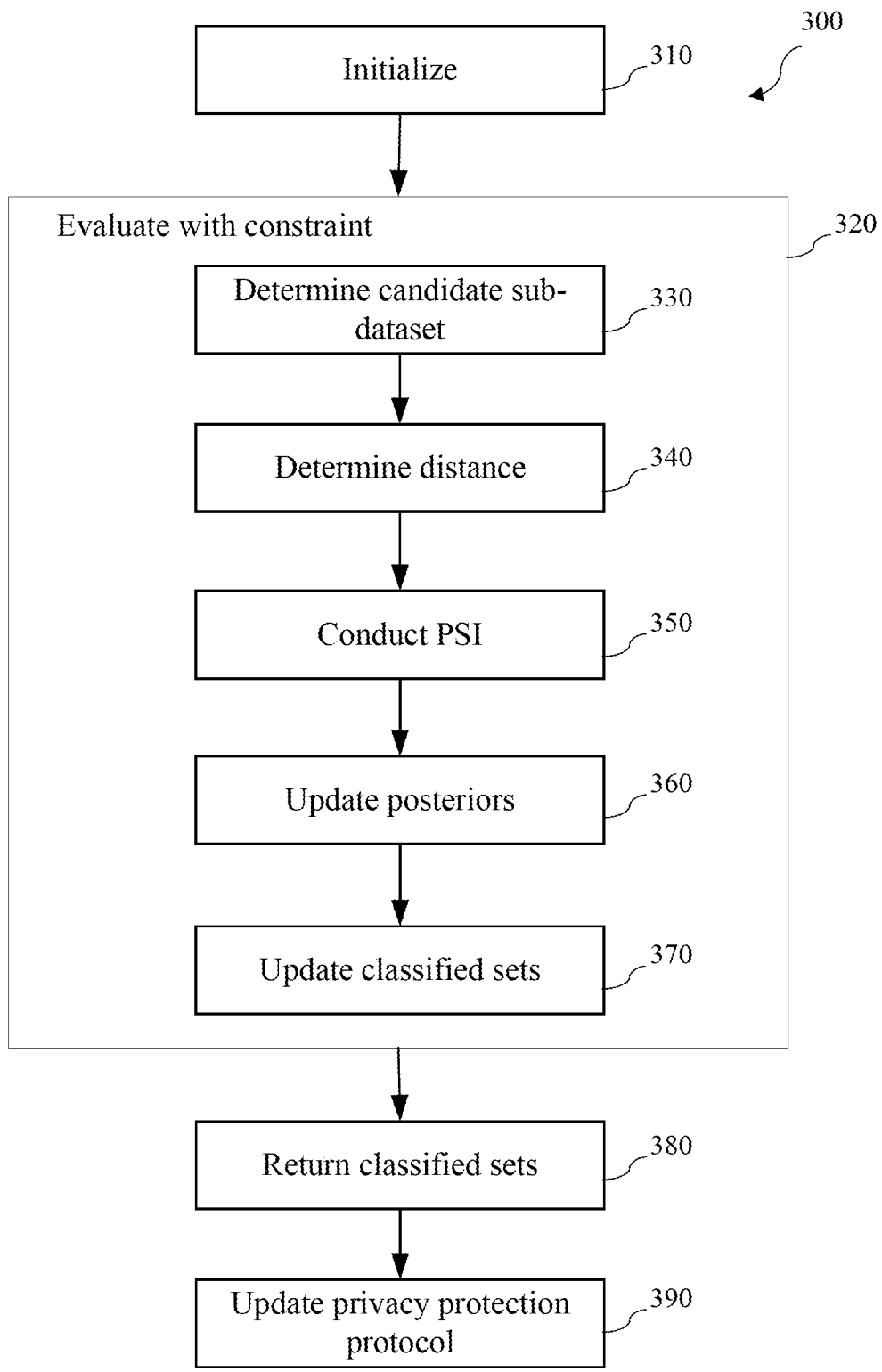
FIG. 3 is a flow chart illustrating an example processing flow for evaluating the effectiveness of a privacy protection protocol, in accordance with at least some embodiments described herein.
Figure 4:
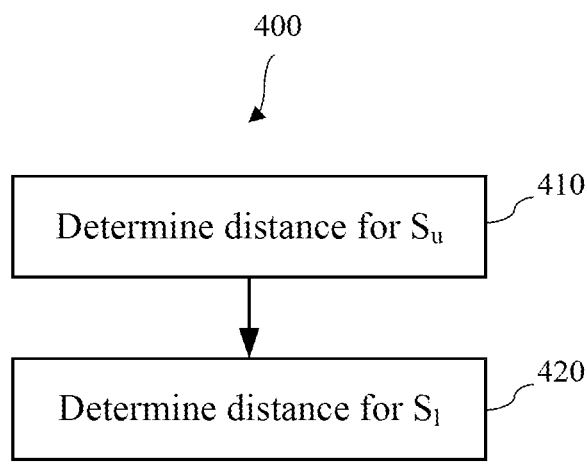
FIG. 4 is a flow chart illustrating an example processing flow for determining a distance for a dataset, in accordance with at least some embodiments described herein.

At stage or step 210, among the original dataset X containing the 8 elements, a sub-dataset (containing 3 elements in this example, where the distance from the posterior possibility of all the sub-datasets of the dataset X to the thresholds is the same, see description of FIG. 4) may be determined (see description of blocks 330 and 340 of FIG. 3), which may be used as an input (along with the input dataset Y) to the next PSI operation (see description of block 350 of FIG. 3). As shown in stage or step 210, the next PSI operation (between the sub-dataset containing the 3 elements and the dataset Y) may reveal the cardinality ("2" in this example) of the resultant intersection. Processing may proceed from stage 210 to stage 220.

At stage or step 220, the newly revealed cardinality ("2") of the resultant intersection at stage 210 may be used to update posterior possibilities of the elements in the sub-dataset containing 3 elements, and the updated posterior possibilities may be 2/|cardinality of the sub-dataset containing the 3 elements |=2/3. For the remaining 5 elements (which are not members of the sub-dataset containing the 3 elements, denoted as "the sub-dataset containing the 5 elements"), their posterior possibilities may be updated to (3−2)/| cardinality of the sub-dataset containing the 5 elements|=1/5, where 3 is the cardinality of intersection of the previous PSI operation from FIG. 2A, and 2 is the cardinality of intersection of the most recent PSI operation from stage 210. See description of block 360 of FIG. 3. No element of dataset X is classified as positive or negative member at this stage 220 and the next evaluation iteration continues. Among those two sub-datasets (e.g., an upper sub-dataset having 3 elements and a lower sub-dataset having 5 elements), the sub-dataset having a smaller distance (see description of blocks 340 and 350 of FIG. 3) may be selected as a candidate input (along with Y) to the next PSI operation. Assuming the sub-dataset having 3 elements is selected, by applying a sampling rate (see description of block 330 of FIG. 3), a portion (2 elements in this example) of the sub-dataset containing the 3 elements are chosen as the final input to (along with Y) to the next PSI operation. In this example, as shown in the sample scenario of stage or step 220, another newly revealed cardinality ("2" again in this example) of the intersection of the PSI operation (between the final input dataset containing the 2 elements and the dataset Y) may be used to update the posterior possibilities of the final input dataset containing the 2 elements, and to update the posterior possibility of the remaining element (1 element in this example, that is not the member of the final input dataset containing 2 elements) in the sub-dataset containing the 3 elements. Processing may proceed from stage 220 to stage 230.

At stage or step 230, based on the updated posterior possibility (compared with the thresholds $\theta_u$ and/or $\theta_l$), the 2 elements in the final input dataset may be classified as positive members, and the 1 remaining element may be classified as negative member. The classified datasets Zpos (containing all identified positive member) and Zneg (containing all identified negative member) are updated so that Zpos contains the 2 positive members and Zneg contains the 1 negative member. See description of block 370 of FIG. 3. The next evaluation iteration continues. Similar to the processing in stage or step 210, among the sub-dataset containing the 5 un-identified elements, a sub-sub-dataset (containing 3 elements in this example, where the distance for all sub-sub-datasets of the sub-dataset of the 5 elements is the same) may be determined (see description of blocks 330 and 340 of FIG. 3), which may be used as an input (along with the input dataset Y) to the next PSI operation (see description of block 350 of FIG. 3). As shown in the sample scenario in the stage or step 230, the new PSI operation (between the sub-sub-dataset containing the 3 elements and the dataset Y) may reveal the cardinality ("0" in this example) of the resultant intersection. Processing may proceed from stage 230 to stage 240.

At stage or step 240, the revealed cardinality ("0") may be used to update posterior possibilities of the elements in the sub-sub-datasets. See description of block 360 of FIG. 3. All 3 elements are classified at this stage 240 as negative members, and the classified datasets Zpos and Zneg are updated (Zpos still contains the 2 positive members, and Zneg now contains 4 negative members). See description of block 370 of FIG. 3. The next evaluation iteration continues. Among the remaining dataset containing the last 2 elements, a sub-dataset (containing 1 element in this example, where the distance for all sub-datasets of the remaining dataset is the same) may be determined (see description of blocks 330 and 340 of FIG. 3), which may be used as an input (along with the input dataset Y) to the next PSI operation (see description of block 350 of FIG. 3). As shown in the sample scenario in the stage or step 240, the new PSI operation (between the sub-dataset containing the 1 element and the dataset Y) may reveal the cardinality ("1" in this example) of the resultant intersection. Processing may proceed from stage 240 to stage 250.

At stage or step 250, the revealed cardinality ("1") may be used to update posterior possibilities of the elements in the sub-datasets. See description of block 360 of FIG. 3. The 2 elements are both classified at this stage 250 as 1 positive member (and now that all 3 positive members from FIG. 2A are identified) and 1 negative member (since all 3 positive members from FIG. 2A are identified, the remaining 1 element must be negative member), and the classified datasets Zpos and Zneg are updated (Zpos contains the 3 positive members, and Zneg contains the 5 negative member). See description of block 370 of FIG. 3. The evaluation process ends since all memberships (positive and negative) of elements in the original dataset X are identified.

FIG. 3 is a flow chart illustrating an example processing flow 300 for evaluating the effectiveness of a privacy protection protocol, in accordance with at least some embodiments described herein. It is to be understood that the processing flow 300 disclosed herein may include one or more processes described in FIGS. 2A and 2B. The processing flow 300 provides a statistical measurement or evaluation based on e.g., a statistical inference to conduct or perform membership (positive or negative membership) inference.

It is to be understood that the processing flow 300 disclosed herein can be conducted by one or more processors (e.g., the processor of one or more of the terminal device 110, 120, 130, and 140 of FIG. 1, the processor of the server 150 of FIG. 1, the central processor unit 605 of FIG. 6, and/or any other suitable processor), unless otherwise specified.

It is also to be understood that the processing flow 300 can include one or more operations, actions, or functions as illustrated by one or more of blocks 310, 320, 330, 340, 350, 360, 370, 380, and 390. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. It is to be understood that before the processing flow 300, operations including initializations or the like may be performed. For example, system parameters and/or application parameters may be initialized.

In an example embodiment, Party A has a dataset X (including a plurality of elements, rows or records) and Party B has a dataset Y (including a plurality of elements, rows or records). It is to be understood that the format, content, and/or arrangement of the datasets described herein are for descriptive purposes only and are not intended to be limiting. Party A is the evaluator of the effectiveness of a privacy protection protocol and/or intersection-size-revealing protocol. That is, Party A may try various attack techniques or running algorithms disclosed herein to reveal membership (positive or negative membership) of elements of dataset X in or with respect to dataset Y, as much as possible to evaluate the effectiveness of the privacy protection protocol.

In an example embodiment, the size or count or cardinality of dataset X may be denoted as |X|, the cardinality of dataset Y may be denoted as |Y|. It is to be understood that "cardinality" is a term of art in mathematics and may refer to a measure of a set's size, meaning the number of elements in the set (or rows, records, etc. in a dataset). The cardinality of the intersection between the dataset X and the dataset Y may be denoted as |X∩Y|. In the context of intersection-size-revealing protocols, the party that receives the intersection size (the cardinality of the intersection) obtains a measure of similarity between its own dataset and the other party's dataset. Given that the party has the freedom to select its own dataset for the protocol, the party can strategically assess the other party's dataset according to its interests (e.g., evaluating the effectiveness of the privacy protection protocol, etc.). In an example embodiment, a PSI-SUM (Private Set Intersection-Sum) operation or protocol may returns a tuple containing the intersection cardinality and the sum of the elements in the intersection (|X∩Y|, $\Sigma_{xi \in (X \cap Y)}$ xi). Features in the embodiments disclosed here in may account for the problems when the evaluator has a multitude of target elements: whether the evaluator can determine the membership (positive or negative membership) of the target elements in the other party's dataset by taking advantage of its ability to measure similarity.

In an example embodiment, Party A (the evaluator, the attacker, etc.) may launch the privacy protection evaluation and may participate in running or executing intersection-size-revealing protocols or algorithms multiple times as a party. During each protocol or algorithm execution, the evaluator (e.g., Party A, etc.) may select its input and obtain the intersection size (the cardinality of the intersection) and/or the summation of the values of the elements in the intersection for a PSI-SUM operation resulting from its input dataset and Party B's dataset. The evaluator is allowed to repeatedly engage in the privacy protection protocol or algorithm invocations with the same party (e.g., Party B, etc.) under a query budget (e.g., a predefined number of times of running or executing the intersection-size-revealing protocols or algorithms). Party A (the evaluator) may have a set of target elements or records and aim to ascertain their membership status (e.g. positive or negative membership) within Party B's dataset. Based on different applications, the evaluator may be interested in different membership information (e.g. positive or negative membership, etc.). Party A can adaptively design the evaluation strategy to maximize the desired return (e.g., the maximum number of elements' positive or negative membership in Party B's dataset). It is to be understood that the evaluator's effectiveness relies on the ability to repeatedly invoke the protocol with Party B. In practical scenarios, the number of times the protocol can be called (invoked, run, executed, etc.) might be limited due to a constraint (e.g., a predetermined number or budget, etc.). Such constraint may limit the evaluator's ability to perform an exhaustive search and reduce the accuracy of the inferred dataset membership. Features of the embodiments disclosed herein may provide an efficient algorithm (or method, protocol, etc.) for evaluating membership leakage in such dataset intersection operations quantitatively, and/or may maximize the number of revealed membership (positive or negative membership) of elements of dataset X in or with respect to dataset Y as much as possible to evaluate the effectiveness of the privacy protection protocol within such constraint. Features of the embodiments disclosed herein can evaluate the effectiveness of the privacy protection protocol even when e.g., noises and/or uncertainties have been introduced to the dataset (e.g., the dataset Y) or the intersection of the datasets (e.g., X and Y), or the dataset (e.g., the dataset Y) or the intersection of the datasets (e.g., X and Y) becomes dynamic.

Referring back to FIG. 3, processing flow 300 may begin at block 310.

At block 310 (Initialize), the processor may perform or conduct a plurality of initialization processes. In an example embodiment, the processor may receive, obtain, or provide a dataset X (e.g., for the evaluator, Party A) containing target elements or records. The target elements (i.e., the elements in the dataset X, etc.) are the elements for which the evaluator tries to identify the membership (e.g., positive or negative membership in or with respect to the dataset Y of Party B). The processor may also receive, obtain, determine, or provide an upper threshold ($\theta_u$), a lower threshold ($\theta_l$), a sampling rate (r), a tolerance factor or number (tol). The thresholds, sampling rate, and tolerance factor are to be described in details below. The processor may further receive, obtain, or provide the constraint $\tau$ (i.e., the maximum allowable number or remaining number of invocations of the PSI (PSI-CA, PSI-SUM, etc.) protocol or invocations of the privacy protection protocol to be evaluated). Also the processor may initialize the classified dataset Zpos (that is used to store the identified/classified positive members) as an empty dataset, and initialize the classified dataset Zneg (that is used to store the identified/classified negative members) as an empty dataset. The processor may also assign each target element (e.g., user, record, etc.) a probability distribution. It is to be understood that before a PSI operation, the probability distribution of each element may be referred to as a prior or prior probability of such element. After a PSI operation, the probability distribution of each element may be referred to as a posterior or posterior probability, which may be updated based on the prior probability and the result(s) of the performed PSI operation.

The processor may further initialize the prior probability (p[i], i=1 to N, where N is the cardinality of the dataset X and 0<=p[i]<=1) of each target element as a random number/variable (e.g., 0.5, etc.). To simplify the description, "posterior probability" (p[i], representing the possibility of the element "i" being a positive or negative member) may be used throughout to represent both the prior probability and the posterior probability, where the posterior probability p[i] is initialized as a random number/variable (e.g., 0.5, etc.). Processing may proceed from block 310 to block 320.

At block 320 (Evaluate with constraint), the processor may perform a loop (e.g., a "while" loop) until (1) the condition |Zpos+Zneg|<N is not met or (2) the condition $\tau$>0 is not met. That is, the loop may end either the membership (positive or negative membership) of all the elements in the dataset X are identified as positive or negative members in or with respect to the dataset Y (|Zpos+Zneg|=|N|), or the constraint number limit is reached (that is, the number t is decreased by 1 each time a PSI operation is invoked, and t is decreased down to 0).

Within block 320, the first processing step is block 330. At block 330 (Determine candidate sub-dataset), the processor may determine or generate candidate sub-dataset e.g., using active learning techniques. Active learning may refer to a process of initiatively identifying or determining a sub-dataset that may lead to the most membership (e.g., the maximum number of positive and/or negative membership) being revealed e.g., in the next PSI operation.

It is to be understood that in the evaluation (of the effectiveness of a privacy protection protocol) process/protocol/algorithm described herein, the evaluator may treat each target element's (e.g., individual's) membership as a random variable (e.g., a binary random variable). It is to be understood that a "random variable" is a term of art in mathematics and may refer to a measurable function from a probability measure space or a sample space to a measurable space. The distribution of the random variable may refer to a probability measure on the set of all possible values of the random variable. The evaluation process described herein is based on updating the posterior possibility on these random variables to maximize or minimize the random variables until the stopping criterion of the evaluation process is matched. The evaluation process described herein may make a guess of each of the elements in the dataset (e.g., in the dataset X), and such strategy may guarantee the guessing accuracy at or above a desirable threshold.

It is also to be understood that in the statistical evaluation described herein, each target element's membership is regarded as a random variable (e.g., a binary random variable), which may allow the evaluator to design a stopping criterion to finish the guessing. As such, the evaluator's goal is to select subsets of the target dataset (e.g., the dataset X and/or sub-dataset of X) so that the evaluator can accurately infer the identity of individual members. Denote $L_i$ as a binary random variable that $L_i$=1 if the i-th element "xi" of the dataset X is in the intersection (xi∈X∩Y) (otherwise $L_i$=0). Then the memberships of the target elements can be specified as a random vector p, where p[i] denotes the probability that $Pr(L_i=1)$ (or $Pr(L_i=0)$) for the i-th element of the dataset X. The evaluator may determine a subset S of the dataset X as an input to the PSI operation (another input to the PSI operation is the dataset Y), the "O" denotes the released or revealed cardinality of the intersection from the PSI operation: O=|S∩Y|.

It is further to be understood that the active learning techniques (used by the processor to determine or generate candidate sub-dataset as an input to the next PSI operation, where another input to the PSI operation is the dataset Y) includes two phases: (1) a phase for constructing candidate sub-datasets by comparing an absolute distance between each posterior possibility (of the elements in the candidate sub-datasets) and a threshold (the upper threshold $\theta_u$ and/or the lower threshold $\theta_l$), and (2) a phase for determining the input dataset (to the PSI operation) based on a minimized Manhattan distance (see description of FIG. 4) between the candidate sub-datasets.

At block 330 (Determine candidate sub-dataset), the processor may also minimize the absolute distance of the posterior possibilities of the elements in the candidate sub-datasets and a threshold (the upper threshold $\theta_u$ nd/or the lower threshold $\theta_l$). It is to be understood that during the evaluation process, the evaluator may aim to select target elements (e.g., individuals) who are likely to meet the stopping criterion of the evaluation process or iteration, as the input dataset for the next PSI operation. Such selection may be done in two different directions: (1) selecting the target elements whose posterior probabilities before the PSI operation (i.e., the prior probabilities) are close to the upper threshold $\theta_u$, and (2) selecting target elements whose posterior probabilities before the PSI operation (i.e., the prior probabilities) are close to the lower threshold $\theta_l$. It is also to be understood that the upper threshold $\theta_u$ and/or the lower threshold $\theta_l$ may serve as a stopping criterion of the evaluation process or iteration, indicating a threshold for a likelihood or possibility of an element being a positive or negative member.

For example, if $\theta_u$ is set or predetermined as 0.99 (or other suitable number between 0.5 and 1), and the current or updated posterior probability of the target element is at or above the upper threshold $\theta_u$, then such target element is considered as a positive member (where the probability of a positive member being a positive member is supposed to be 1 or 100%). If $\theta_l$ is set or predetermined as 0.01 (or other suitable number between 0 and 0.5), and the current or updated posterior probability of the target element is at or below the lower threshold $\theta_l$, then such target element is considered as a negative member (where the probability of a negative member being a negative member is supposed to be 0). The determination and utilization of the upper threshold $\theta_u$ and/or the lower threshold $\theta_l$ may provide an effective evaluation while making negligible compromises on inference accuracy. The closer the upper threshold $\theta_u$ is to 1 and/or the closer the lower threshold $\theta_l$ is to 0, more accurate the results of the membership inference may be, and less efficient the evaluation may be (e.g., more time and/or more number of invocations of the PSI operations may be needed to stop or end the evaluation process for membership inference). Further the upper threshold $\theta_u$ is to 1 and/or the further the lower threshold $\theta_l$ is to 0, less accurate the results of the membership inference may be, and more efficient the evaluation may be (e.g., less time and/or less number of invocations of the PSI operations may be needed to stop or end the evaluation process for membership inference).

It is to be understood that the absolute distance of the posterior possibility of each target element in the candidate sub-datasets and the upper threshold can be denoted as $d_i^u$ which can be $|p[i]-\theta_u|$. The absolute distance of the posterior possibility of each target element in the candidate sub-datasets and the lower threshold can be denoted as $d_i^l$ which can be $|p[i]-0_l|$.

For a given iteration (of the "while" loop of bock 320), the minimized distances (to the upper threshold and to the lower threshold) in the posterior vector "p" can be defined as $d_{min}^u = \min_i d_i^u$ and $d_{min}^l = \min_i d_i^l$, respectively. It is to be understood that directly selecting target elements with the highest or lowest posterior possibilities (and/or prior possibilities), i.e., selecting elements having the minimum distance between their corresponding posterior possibilities and the upper threshold (and/or the lower threshold), may introduce no randomness to the output, potentially leading to an endless loop (or a loop resulting no useful results) in the evaluation process.

As such, the sampling rate (r) and the tolerance factor (tol) may be provided, obtained, determined, or generated by the processor, to introduce randomness to the output, to improve the efficiency of the evaluation process. The sampling rate (r) may indicate a portion of elements to be selected. In an example embodiment, the sampling rate (r) can be a value between 0 and 1 (e.g., 0.5, 0.3, 0.8, etc.). If M elements satisfy a certain condition and are to be selected, sampling rate of r indicates that a random r×M elements among the M elements may be selected instead of selecting the M elements. The tolerance factor (tol) can be a value between 0 and 0.5 (e.g., 0.2, 0.15, etc.). The tolerance factor (tol) may indicate a desired range between (1) the distance between the posterior possibility of the element and the threshold (the upper threshold or the lower threshold) and (2) the minimized distances (to the upper threshold or to the lower threshold). For example, if the threshold tol is 0.05 and the minimized distance ($d_{min}^u$ or $d_{min}^l$) is 0.1, then all the elements having a distance that is tol+$d_{min}^u$ (or $d_{min}^l$) or less, which is 0.05+0.1=0.15 or less, may be selected, instead of only those elements having the minimized distance ($d_{min}^u$ or $d_{min}^l$) being selected. In an example embodiment, the sampling rate (r) and/or the tolerance factor (tol) can be predetermined fixed value throughout the evaluation process. In an example embodiment, the sampling rate (r) and/or the tolerance factor (tol) can be dynamically changed (e.g., each time before or after a PSI operation) during the evaluation process.

It is to be understood that the sampling rate and the tolerance factor may together determine the grouping methods for selecting the elements for candidate sub-datasets (of the dataset X) as an input (to the next PSI operation, with another input being the dataset Y). The candidate sub-datasets for the next iterations (of the loop of block 320) includes two sub-datasets:

$$\mathbb{S}^u = \bigcup_{d_i^u[i]-d_{min}^u \leq tol} x_i \cdot 1_{sample}, \text{ and}$$

$$\mathbb{S}^l = \bigcup_{d_i^l[i]-d_{min}^l \leq tol} x_i \cdot 1_{sample},$$

where $1_{sample}$ is an indicator function that determined by the sampling result (i.e., the sampling rate). For example, $S^u$ is a candidate sub-dataset of the dataset X, where among all elements having a distance $d_i^u$ (between the element's posterior probability and the upper threshold), which is within the tolerance tol with respect to the minimized distance $d_{min}^u$ (to the upper threshold) (assuming K elements in the dataset X meet such condition), a portion (by multiplying the sampling rate r) of all such elements (K×r) are randomly selected to be part of the candidate sub-dataset $S^u$, and the cardinality of $S^u$ is K×r converted to a closest integer. Similarly, $S^l$ is a candidate sub-dataset of the dataset X, where among all elements having a distance $d_i^l$ (between the element's posterior probability and the lower threshold), which is within the tolerance tol with respect to the minimized distance $d_{min}^l$ (to the lower threshold) (assuming J elements in the dataset X meet such condition), a portion (by multiplying the sampling rate r) of all such elements (J×r) are randomly selected to be part of the candidate sub-dataset $S^l$, and the cardinality of $S^l$ is J×r converted to a closest integer.

It is also to be understood that a larger tolerance factor may result in grouping more target elements who are not prone to meet the stopping criterion of the evaluation process, where meeting the stopping criterion indicates that the element's posterior possibility is at or above the upper threshold or is at or below the lower threshold. A larger tolerance factor allows for a broader exploration of target elements in the search for those whose posterior probabilities may cross the thresholds, and a larger candidate size may increase the number of target elements whose memberships can be inferred in one iteration. A small sampling rate tends to narrow down the inference scope quickly. The evaluator can rapidly infer a smaller portion of target elements with positive or negative memberships. When the sampling rate is too small, such approach may lead to a decreased overall inference efficiency since the algorithm may become prone to a depth-first search behavior. The choice of the sampling rate and tolerance factor depends on the specific evaluation objectives and constraints. By carefully tuning the parameters (the sampling rate and/or the tolerance factor), the evaluator can balance the trade-off between the efficiency of the evaluation process, the number of inferences made in each iteration (of the loop of block 320), and/or the overall accuracy of the inference/evaluation process.

In sum, at block 330 (Determine candidate sub-dataset), the processor may determine or generate candidate sub-datasets $S^u$ and/or $S^l$ of the dataset X. Processing may proceed from block 330 to block 340.

At block 340 (Determine distance), the processor may determine a distance (e.g., a minimized Manhattan distance) for candidate sub-datasets $S^u$ and/or $S^l$. See FIG. 4 for details. Processing may proceed from block 340 to block 350.

At block 350 (Conduct PSI), the processor may select, between the candidate sub-datasets $S^u$ and $S^l$, the sub-dataset having a smaller distance determined at block 340. Assuming $S^u$ has a smaller distance than $S^l$, the processor may conduct, invoke, execute, run, or perform a PSI (PSI-CA, PSI-SUM, etc.) operation on the dataset $S^u$ and the dataset Y; obtain, receive, or generate the cardinality of the resultant intersection $CS^u$; and decrease the constraint number τ by 1 (τ=τ−1). It is to be understood that the cardinality of the intersection $CS^u$ may indicate how many positive members the dataset $S^u$ has. The constraint number t is the remaining constraint (e.g., the remaining number of times the PSI operation may be invoked). Processing may proceed from block 350 to block 360.

At block 360 (Update posteriors), the processor may update the posterior possibilities for all elements in the selected candidate sub-dataset $S^u$ (at block 350) based on the resultant cardinality of intersection $CS^u$ of block 350, and update the posterior possibilities for all the remaining elements in the dataset X or in the sub-dataset of X (those elements in the dataset X or in the sub-dataset of X that are not members of the sub-dataset $S^u$) based on the resultant cardinality of intersection $CS^u$ of block 350. See the description of FIG. 5. Processing may proceed from block 360 to block 370.

At block 370 (Update classified sets), the processor may perform a loop (e.g., a "for" loop) conditioned on all the elements in the dataset X or in the sub-dataset of X are processed. The condition can be "1<=i<=N", indicating the integer i starts from 1 to the cardinality N of the dataset X or the sub-dataset of X. Within the "for" loop, the processor may update the classified datasets Zneg and Zpos by: if in the dataset X or in the sub-dataset of X, the i-th element's ($X_i$) posterior possibility p[i] is at or below the lower threshold $θ_l$, such element is considered as a negative member, and Zneg is updated as Zneg ∪ $X_i$; and if the i-th element's posterior possibility p[i] is at or above the upper threshold $θ_u$, such element is considered as a positive member, and Zpos is updated as Zpos ∪ $X_i$. Processing may proceed from block 370 to the start of block 320 until the loop of the block 320 ends. Processing may then proceed from block 370 or 320 to block 380.

At block 380 (Return classified sets), the processor may return the classified datasets Zneg and Zpos as output of the privacy protection protocol evaluation algorithm. The processor may also evaluate the effectiveness of the privacy protection protocol (e.g., the PSI protocol) by measuring the number of positive numbers in the dataset Zpos and/or the number of negative numbers in the dataset Zneg. More numbers in Zneg and/or Zpos, given a same constraint (e.g., the number of maximum allowed number of invocation of the privacy protection protocol to be evaluated), less effective the privacy protection protocol (to be evaluated) may be. Processing may proceed from block 380 to block 390.

At block 390 (Update privacy protection protocol), the processor may improve the privacy protection protocol to be evaluated by at least one of (1) adding noise(s) to the dataset Y, (2) reduce the maximum allowable number (τ) of invocations of the privacy protection protocol to be evaluated, (3) add noise(s) to intersection results when a PSI operation is performed between a dataset and the dataset Y, etc., based on the evaluation of the privacy protection protocol (e.g., the PSI protocol).

FIG. 4 is a flow chart illustrating an example processing flow 400 for determining a distance for a dataset (see the description of block 340 of FIG. 3), in accordance with at least some embodiments described herein.

It is to be understood that the processing flow 400 disclosed herein can be conducted by one or more processors (e.g., the processor of one or more of the terminal device 110, 120, 130, and 140 of FIG. 1, the processor of the server 150 of FIG. 1, the central processor unit 605 of FIG. 6, and/or any other suitable processor), unless otherwise specified.

It is also to be understood that the processing flow 400 can include one or more operations, actions, or functions as illustrated by one or more of blocks 410 and 420. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. It is to be understood that before the processing flow 400, operations including initializations or the like may be performed. For example, system parameters and/or application parameters may be initialized. Processing flow 400 may begin at block 410.

At block 410 (Determine distance for $S_u$), the processor may determine a distance for the dataset $S_u$. It is to be understood that the dataset $S^u$ may be the candidate sub-dataset $S^u$ determined at block 330 of FIG. 3. The distance may be a Manhattan distance between (the posterior possibility of each element in) the dataset $S^u$ and the upper threshold $\theta_u$. Manhattan distance is a term of art and may refer to a distance between two points measured along axes at right angles, or a distance measure that is measured by taking the sum of distances between the x and y coordinates. In an example embodiment, the Manhattan distance $D_u$ between (the posterior possibility of each element in) the dataset $S^u$ and the upper threshold $\theta_u$ may be represented as:

$$D_u = \sum_{i:x_i \in S_u} d_i^u / |S_u|,$$

where $d_i^u$ is the distance between the i-th element's posterior probability and the upper threshold, and $|S_u|$ is the cardinality (or size, count, etc.) of the dataset $S_u$. Processing may proceed from block 410 to block 420.

At block 420 (Determine distance for $S_l$), the processor may determine a distance for the dataset $S_l$. It is to be understood that the dataset $S_l$ may be the candidate sub-dataset $S^l$ determined at block 330 of FIG. 3. The distance may be a Manhattan distance between (the posterior possibility of each element in) the dataset $S_l$ and the lower threshold $\theta_l$. In an example embodiment, the Manhattan distance $D_l$ between (the posterior possibility of each element in) the dataset $S_l$ and the lower threshold $\theta_l$ may be represented as:

$$D_l = \sum_{i:x_i \in S_l} d_i^l / |S_l|,$$

where $d_i^l$ is the distance between the i-th element's posterior probability and the lower threshold, and $|S_l|$ is the cardinality (or size, count, etc.) of the dataset $S_l$.

It is to be understood that as the evaluator keeps invoking the PSI operation, each target element's posterior possibility is pushing either towards $\theta_u$ or $\theta_l$. See description of FIG. 5 and block 360 of FIG. 3. Given a tolerant factor tol, before each invocation of the PSI operation, the evaluator may select from $S^u$ and $S_l$ as an input for the next PSI operation. The processor may minimize the Manhattan distance by comparing the Manhattan distance between $S^u$ and $\theta_u$, and $S_l$ and $\theta_l$. The evaluator may select the dataset (between $S^u$ and $S_l$) with a smaller distance towards the corresponding threshold (e.g., the smaller Manhattan distance towards the corresponding threshold). See description of blocks 340 and 350 of FIG. 3.

Figure 5:
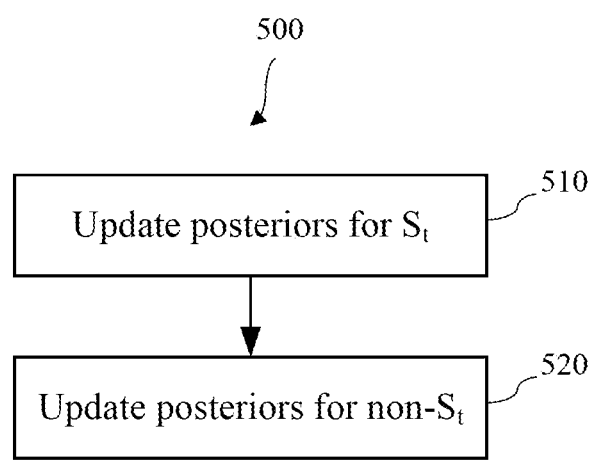
FIG. 5 is a flow chart illustrating an example processing flow for updating the posterior possibility, in accordance with at least some embodiments described herein.

FIG. 5 is a flow chart illustrating an example processing flow 500 for updating the posterior possibility (see the description of block 360 of FIG. 3), in accordance with at least some embodiments described herein.

It is to be understood that the processing flow 500 disclosed herein can be conducted by one or more processors (e.g., the processor of one or more of the terminal device 110, 120, 130, and 140 of FIG. 1, the processor of the server 150 of FIG. 1, the central processor unit 605 of FIG. 6, and/or any other suitable processor), unless otherwise specified.

It is also to be understood that the processing flow 500 can include one or more operations, actions, or functions as illustrated by one or more of blocks 510 and 520. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. It is to be understood that before the processing flow 500, operations including initializations or the like may be performed. For example, system parameters and/or application parameters may be initialized. Processing flow 500 may begin at block 510.

At block 510 (Update posteriors for $S_t$), the processor may update the posterior possibilities for all elements in the dataset $S_t$ (e.g., the selected candidate sub-dataset $S^u$ at block 350) based on the cardinality $O_t$ of the intersection revealed in the most recent PSI operation (e.g., the resultant cardinality of intersection $CS^u$ of block 350).

It is to be understood that after each PSI operation (between the dataset $S_t$ and the dataset Y), the evaluator can observe the cardinality of the intersection $O_t$ of $S_t$ and Y, which indicates the positive members (in or with respect to the dataset Y of Party B) contained in the dataset $S_t$ which is an input of the PSI operation. Based on the observation, the evaluator may update the posterior possibilities for the elements in the dataset $S_t$, based on a maximum likelihood criterion (to be described in detail below). For example, for a given pair of PSI input $S_t$ and output $O_t$ (the cardinality of the resultant intersection from the PSI operation), the updated posterior possibility p[i] for each element in the dataset $S_t$ is $O_t/|S_t|$, where $|S_t|$ is the cardinality of the dataset $S_t$. For example, if the cardinality of the dataset $S_t$ is 8 (i.e., the dataset $S_t$ has 8 elements, rows, records, etc.), and the $O_t$ (the cardinality of the resultant intersection from the PSI operation between $S_t$ and Y) is 3, then the posterior possibility for each element in the dataset $S_t$ is updated to ⅜, which indicates that each element in the dataset $S_t$ has possibility of ⅜ being a positive member of the dataset Y (or has possibility of 1−⅜=⅝ being a negative member of the dataset Y).

It is to be understood that the update to the posterior possibility may reflect the ratio of positive members observed (i.e., $O_t$) to the cardinality of the dataset $S_t$ (which is an input to the PSI operation between $S_t$ and Y). The higher the observed positive count $O_t$ relative to the size of the dataset $S_t$, the higher the posterior possibility assigned to each element in the dataset $S_t$. Processing may proceed from block 510 to block 520.

At block 520 (Update posteriors for non-$S_t$), the processor may update the posterior possibilities for all the remaining elements in dataset X or sub-dataset of the dataset X containing $S_t$ (i.e., those elements in the dataset X or sub-dataset of the dataset X that are not members of the dataset $S_t$, denoted as a dataset "non-$S_t$", where X or sub-dataset of X contains $S_t$) based on the cardinality $O_t$ of the intersection revealed in the most recent PSI operation (e.g., the resultant cardinality of intersection $CS^u$ of block 350). It is to be understood that all datasets containing $S_t$ may update the posterior possibilities for all their elements. The intersection of $S_t$ and non-$S_t$ is empty. It is also to be understood that the cardinality of PSI operation of X or subset of X (i.e., the union of $S_t$, non-$S_t$) and Y is known (e.g., based on the PSI operation immediately prior to the most recent PSI operation), denoted as $O_{total}$. After observing the output $O_t$, the posterior possibility (p[i]) of each element's membership in the dataset non-$S_t$ is updated as $(O_{total}-O_t)/$ non-$S_t|$, where $|$non-$S_t|$ is the cardinality of the dataset non-$S_t$. That is, such update for non-$S_t$ is based on the remaining positive count $(O_{total}-O_t)$ after subtracting the observed positive count $O_t$ from the known total positive count $O_{total}$. The posterior possibility is determined by dividing this remaining positive count by the cardinality of non-$S_t$. See the example of FIG. 2B.

It is to be understood that by updating the posterior possibility based on the observed positive counts (from the cardinality revealed in the most recent PSI operation) and known total positive counts (e.g., from the cardinality revealed in the PSI operation immediately prior to the most recent PSI operation), the evaluator can refine the posterior possibilities about the membership status of each element in the respective sub-datasets. The iterative posterior possibility update process may enable the evaluator to incorporate new information and adjust the membership inference based on the observed results.

Regarding the stopping criterion of the evaluation process, it is to be understood that in the statistical evaluation, the evaluator has the flexibility to enhance the inference efficiency at the cost of sacrificing some inference accuracy. This flexibility may be achieved through the use of a stopping criterion, which involves setting an upper threshold $\theta_u$ and a lower threshold $\theta_l$. The evaluator can classify an element's membership as positive if its posterior probability is greater than or equal to $\theta_u$, and as negative if is less than or equal to $\theta_l$. It is also to be understood that the selection of the thresholds (upper and lower) may play a crucial role in determining the performance of the evaluation process. The threshold values can significantly influence the trade-off between inference accuracy and the number of elements' memberships inferred.

For example, if the upper threshold $\theta_u$ is set close to 1 and the lower threshold $\theta_l$ is set close to 0, the inference evaluation may achieve a high accuracy, but there may be a limited number of element memberships inferred within the constraint (the maximum allowable number of invocations of PSI operation). This is because the evaluator may require a higher level of certainty before classifying an element as a positive or negative member. As such, only elements with posterior probabilities close to the extremes may be confidently classified, potentially leading to a reduced number of identified elements. On the other hand, if both the upper threshold $\theta_u$ and the lower threshold $\theta_l$ are set close to 0.5, a larger proportion of elements' memberships can be inferred. However, the inference accuracy may be compromised. With lower thresholds (e.g., both upper and lower thresholds being closer to 0.5), elements with relatively uncertain posterior probabilities may be classified, resulting in a higher number of elements being identified. Nevertheless, the trade-off is that the accuracy of these classifications may be lower compared to using more stringent thresholds (e.g., upper threshold being closer to 1 and lower threshold being closer to 0).

It is to be understood that features in the embodiments disclosed herein may quantify the set (or dataset) privacy leakage (such as membership privacy leakage, etc.) for intersection-size-revealing protocols (e.g., PSI-CA, PSI-SUM, etc.). Features in the embodiments disclosed herein may also capitalize on both positive and negative membership elements, augmenting the membership measurement efficiency substantially. Features in the embodiments disclosed herein may provide a premier approach evaluating and addressing set membership leakage by treating each individual's membership as a random variable. Features in the embodiments disclosed herein may measure set membership leakage in the context of privacy-protected protocols, including those safeguarded by e.g., differential privacy protocol or algorithms (e.g., where noise being introduced to the dataset(s) and/or the resultant intersection). Features in the embodiments disclosed herein may merge active learning and Bayesian inference (including Bayesian posterior update) and provide a dynamic and robust approach for evaluating the effectiveness of privacy protection protocols.

FIG. 6 is a schematic structural diagram of an example computer system 600 applicable to implementing an electronic device (for example, the server or one of the terminal devices shown in FIG. 1), arranged in accordance with at least some embodiments described herein. It is to be understood that the computer system shown in FIG. 6 is provided for illustration only instead of limiting the functions and applications of the embodiments described herein.

As depicted, the computer system 600 may include a central processing unit (CPU) 605. The CPU 605 may perform various operations and processing based on programs stored in a read-only memory (ROM) 610 or programs loaded from a storage device 640 to a random-access memory (RAM) 615. The RAM 615 may also store various data and programs required for operations of the system 600. The CPU 605, the ROM 610, and the RAM 615 may be connected to each other via a bus 620. An input/output (I/O) interface 625 may also be connected to the bus 620.

The components connected to the I/O interface 625 may further include an input device 630 including a keyboard, a mouse, a digital pen, a drawing pad, or the like; an output device 635 including a display such as a liquid crystal display (LCD), a speaker, or the like; a storage device 640 including a hard disk or the like; and a communication device 645 including a network interface card such as a LAN card, a modem, or the like. The communication device 645 may perform communication processing via a network such as the Internet, a WAN, a LAN, a LIN, a cloud, etc. In an embodiment, a driver 650 may also be connected to the I/O interface 625. A removable medium 655 such as a magnetic disk, an optical disk, a magneto-optical disk, a semiconductor memory, or the like may be mounted on the driver 650 as desired, such that a computer program read from the removable medium 655 may be installed in the storage device 640.

It is to be understood that the processes described with reference to the flowcharts of FIGS. 3-5 and/or the processes described in other figures may be implemented as computer software programs or in hardware. The computer program product may include a computer program stored in a computer readable non-volatile medium. The computer program includes program codes for performing the method shown in the flowcharts and/or GUIs. In this embodiment, the computer program may be downloaded and installed from the network via the communication device 645, and/or may be installed from the removable medium 655. The computer program, when being executed by the central processing unit (CPU) 605, can implement the above functions specified in the method in the embodiments disclosed herein.

It is to be understood that the disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array, an application specific integrated circuit, or the like.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory, electrically erasable programmable read-only memory, and flash memory devices; magnetic disks, e.g., internal hard disks or removable disks; magneto optical disks; and compact disc read-only memory and digital video disc read-only memory disks. The processor and the memory can be supplemented by, or incorporated in, special purpose logic circuitry.

It is to be understood that different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

Aspects:

It is appreciated that any one of aspects can be combined with each other.

Aspect 1. A method for evaluating privacy protection, the method comprising: determining a first sub-dataset of a first dataset based on a sampling rate, a tolerance, and a first threshold; determining a second sub-dataset of the first dataset based on the sampling rate, the tolerance, and a second threshold; determining a first distance between the first sub-dataset and the first threshold; determining a second distance between the second sub-dataset and the second threshold; generating a first intersection of the first sub-dataset and a second dataset and updating posterior for elements of the first dataset based on the first intersection when the first distance is less than or equal to the second distance; and determining positive membership and negative membership for the elements of the first dataset in the second dataset based on the posterior for the elements of the first dataset.

Aspect 2. The method of aspect 1, further comprising: evaluating a privacy protection protocol based on a number of positive membership and a number of negative membership for the elements of the first dataset in the second dataset.

Aspect 3. The method of aspect 1 or aspect 2, further comprising: generating a second intersection of the second sub-dataset and the second dataset and updating the posterior for the elements of the first dataset based on the second intersection when the first distance is greater than the second distance.

Aspect 4. The method of aspect 3, wherein the updating of the posterior for the elements of the first dataset based on the second intersection includes: updating posterior for elements of the second sub-dataset based on a ratio of a size of the second intersection and a size of the second sub-dataset.

Aspect 5. The method of any one of aspects 1-4, wherein the determining of positive membership and negative membership for the elements of the first dataset in the second dataset based on the posterior for the elements of the first dataset includes: determining positive membership for the elements of the first dataset in the second dataset based on the first threshold and the posterior for the elements of the first dataset; and determining negative membership for the elements of the first dataset in the second dataset based on the second threshold and the posterior for the elements of the first dataset.

Aspect 6. The method of any one of aspects 1-5, further comprising: initializing the posterior for the elements of the first dataset with a random variable.

Aspect 7. The method of any one of aspects 1-6, wherein the updating of the posterior for the elements of the first dataset based on the first intersection includes: updating posterior for elements of the first sub-dataset based on a ratio of a size of the first intersection and a size of the first sub-dataset.

Aspect 8. A privacy protection evaluation system, the system comprising: a memory to store a first dataset, a sampling rate, a tolerance, a first threshold, and a second threshold; a processor to: determine a first sub-dataset of the first dataset based on the sampling rate, the tolerance, and the first threshold; determine a second sub-dataset of the first dataset based on the sampling rate, the tolerance, and the second threshold; determine a first distance between the first sub-dataset and the first threshold; determine a second distance between the second sub-dataset and the second threshold; generate a first intersection of the first sub-dataset and a second dataset and update posterior for elements of the first dataset based on the first intersection when the first distance is less than or equal to the second distance; and determine positive membership and negative membership for the elements of the first dataset in the second dataset based on the posterior for the elements of the first dataset.

Aspect 9. The system of aspect 8, wherein the processor is to further: evaluate a privacy protection protocol based on a number of positive membership and a number of negative membership for the elements of the first dataset in the second dataset.

Aspect 10. The system of aspect 8 or aspect 9, wherein the processor is to further: generate a second intersection of the second sub-dataset and the second dataset and update the posterior for the elements of the first dataset based on the second intersection when the first distance is greater than the second distance.

Aspect 11. The system of aspect 10, wherein the processor is to further: update posterior for elements of the second sub-dataset based on a ratio of a size of the second intersection and a size of the second sub-dataset.

Aspect 12. The system of any one of aspects 8-11, wherein the processor is to further: determine positive membership for the elements of the first dataset in the second dataset based on the first threshold and the posterior for the elements of the first dataset; and determine negative membership for the elements of the first dataset in the second dataset based on the second threshold and the posterior for the elements of the first dataset.

Aspect 13. The system of any one of aspects 8-12, wherein the processor is to further: initialize the posterior for the elements of the first dataset with a random variable.

Aspect 14. The system of any one of aspects 8-13, wherein the processor is to further: update posterior for elements of the first sub-dataset based on a ratio of a size of the first intersection and a size of the first sub-dataset.

Aspect 15. A non-transitory computer-readable medium having computer-executable instructions stored thereon that, upon execution, cause one or more processors to perform operations comprising: determining a first sub-dataset of a first dataset based on a sampling rate, a tolerance, and a first threshold; determining a second sub-dataset of the first dataset based on the sampling rate, the tolerance, and a second threshold; determining a first distance between the first sub-dataset and the first threshold; determining a second distance between the second sub-dataset and the second threshold; generating a first intersection of the first sub-dataset and a second dataset and updating posterior for elements of the first dataset based on the first intersection when the first distance is less than or equal to the second distance; and determining positive membership and negative membership for the elements of the first dataset in the second dataset based on the posterior for the elements of the first dataset.

Aspect 16. The computer-readable medium of aspect 15, wherein the operations further comprise: evaluating a privacy protection protocol based on a number of positive membership and a number of negative membership for the elements of the first dataset in the second dataset.

Aspect 17. The computer-readable medium of aspect 15 or aspect 16, wherein the operations further comprise: generating a second intersection of the second sub-dataset and the second dataset and updating the posterior for the elements of the first dataset based on the second intersection when the first distance is greater than the second distance.

Aspect 18. The computer-readable medium of aspect 17, wherein the updating of the posterior for the elements of the first dataset based on the second intersection includes: updating posterior for elements of the second sub-dataset based on a ratio of a size of the second intersection and a size of the second sub-dataset.

Aspect 19. The computer-readable medium of any one of aspects 15-18, wherein the determining of positive membership and negative membership for the elements of the first dataset in the second dataset based on the posterior for the elements of the first dataset includes: determining positive membership for the elements of the first dataset in the second dataset based on the first threshold and the posterior for the elements of the first dataset; and determining negative membership for the elements of the first dataset in the second dataset based on the second threshold and the posterior for the elements of the first dataset.

Aspect 20. The computer-readable medium of any one of aspects 15-19, wherein the updating of the posterior for the elements of the first dataset based on the first intersection includes: updating posterior for elements of the first sub-dataset based on a ratio of a size of the first intersection and a size of the first sub-dataset.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A method for evaluating a privacy protection protocol, the method comprising:
   determining a first sub-dataset of a first dataset based on a sampling rate, a tolerance, and a first threshold;
   determining a second sub-dataset of the first dataset based on the sampling rate, the tolerance, and a second threshold;
   determining a first distance between the first sub-dataset and the first threshold;
   determining a second distance between the second sub-dataset and the second threshold;
   generating a first intersection of the first sub-dataset and a second dataset and updating posterior for elements of the first dataset based on the first intersection when the first distance is less than or equal to the second distance;

determining positive membership and negative membership for the elements of the first dataset in the second dataset based on the posterior for the elements of the first dataset; and updating to improve the privacy protection protocol using the determined positive membership and negative membership for the elements of the first dataset in the second dataset.

2. The method of claim 1, wherein updating the privacy protection protocol comprises at least one of the following: (i) adding noise to the second dataset, (ii) reducing a maximum number of allowable invocations of the privacy protection protocol, or (iii) adding noise to intersection results generated by the privacy protection protocol using the second dataset.

3. The method of claim 1, further comprising:
generating a second intersection of the second sub-dataset and the second dataset and updating the posterior for the elements of the first dataset based on the second intersection when the first distance is greater than the second distance.

4. The method of claim 3, wherein the updating of the posterior for the elements of the first dataset based on the second intersection includes:
updating posterior for elements of the second sub-dataset based on a ratio of a size of the second intersection and a size of the second sub-dataset.

5. The method of claim 1, wherein the determining of positive membership and negative membership for the elements of the first dataset in the second dataset based on the posterior for the elements of the first dataset includes:
determining positive membership for the elements of the first dataset in the second dataset based on the first threshold and the posterior for the elements of the first dataset; and
determining negative membership for the elements of the first dataset in the second dataset based on the second threshold and the posterior for the elements of the first dataset.

6. The method of claim 1, further comprising:
initializing the posterior for the elements of the first dataset with a random variable.

7. The method of claim 1, wherein the updating of the posterior for the elements of the first dataset based on the first intersection includes:
updating posterior for elements of the first sub-dataset based on a ratio of a size of the first intersection and a size of the first sub-dataset.

8. A privacy protection evaluation system, the system comprising:
one or more computers and one or more storage devices on which are stored instructions that are operable, when executed by the one or more computers, to cause the one or more computers to perform operations for evaluating a privacy protection protocol, the operations comprising:
determining a first sub-dataset of a first dataset based on a sampling rate, a tolerance, and a first threshold;
determining a second sub-dataset of the first dataset based on the sampling rate, the tolerance, and a second threshold;
determining a first distance between the first sub-dataset and the first threshold;
determining a second distance between the second sub-dataset and the second threshold;
generating a first intersection of the first sub-dataset and a second dataset and update posterior for elements of the first dataset based on the first intersection when the first distance is less than or equal to the second distance;
determining positive membership and negative membership for the elements of the first dataset in the second dataset based on the posterior for the elements of the first dataset; and
updating to improve the privacy protection protocol using the determined positive membership and negative membership for the elements of the first dataset in the second dataset.

9. The system of claim 8, wherein updating the privacy protection protocol comprises at least one of the following:
(i) adding noise to the second dataset, (ii) reducing a maximum number of allowable invocations of the privacy protection protocol, or (iii) adding noise to intersection results generated by the privacy protection protocol using the second dataset.

10. The system of claim 8, wherein the operations comprise:
generating a second intersection of the second sub-dataset and the second dataset and update the posterior for the elements of the first dataset based on the second intersection when the first distance is greater than the second distance.

11. The system of claim 10, wherein the operations comprise:
updating posterior for elements of the second sub-dataset based on a ratio of a size of the second intersection and a size of the second sub-dataset.

12. The system of claim 8, wherein the operations comprise:
determining positive membership for the elements of the first dataset in the second dataset based on the first threshold and the posterior for the elements of the first dataset; and
determining negative membership for the elements of the first dataset in the second dataset based on the second threshold and the posterior for the elements of the first dataset.

13. The system of claim 8, wherein the operations comprise:
initializing the posterior for the elements of the first dataset with a random variable.

14. The system of claim 8, wherein the operations comprise:
updating posterior for elements of the first sub-dataset based on a ratio of a size of the first intersection and a size of the first sub-dataset.

15. A non-transitory computer-readable medium having computer-executable instructions stored thereon that, upon execution, cause one or more processors to perform operations for evaluating a privacy protection protocol, the operations comprising:
determining a first sub-dataset of a first dataset based on a sampling rate, a tolerance, and a first threshold;
determining a second sub-dataset of the first dataset based on the sampling rate, the tolerance, and a second threshold;
determining a first distance between the first sub-dataset and the first threshold;
determining a second distance between the second sub-dataset and the second threshold;
generating a first intersection of the first sub-dataset and a second dataset and updating posterior for elements of the first dataset based on the first intersection when the first distance is less than or equal to the second distance;

determining positive membership and negative membership for the elements of the first dataset in the second dataset based on the posterior for the elements of the first dataset; and updating to improve the privacy protection protocol using the determined positive membership and negative membership for the elements of the first dataset in the second dataset.

16. The computer-readable medium of claim 15, wherein updating the privacy protection protocol comprises at least one of the following:
(i) adding noise to the second dataset, (ii) reducing a maximum number of allowable invocations of the privacy protection protocol, or (iii) adding noise to intersection results generated by the privacy protection protocol using the second dataset.

17. The computer-readable medium of claim 15, wherein the operations further comprise:
generating a second intersection of the second sub-dataset and the second dataset and updating the posterior for the elements of the first dataset based on the second intersection when the first distance is greater than the second distance.

18. The computer-readable medium of claim 17, wherein the updating of the posterior for the elements of the first dataset based on the second intersection includes:
updating posterior for elements of the second sub-dataset based on a ratio of a size of the second intersection and a size of the second sub-dataset.

19. The computer-readable medium of claim 15, wherein the determining of positive membership and negative membership for the elements of the first dataset in the second dataset based on the posterior for the elements of the first dataset includes:
determining positive membership for the elements of the first dataset in the second dataset based on the first threshold and the posterior for the elements of the first dataset; and
determining negative membership for the elements of the first dataset in the second dataset based on the second threshold and the posterior for the elements of the first dataset.

20. The computer-readable medium of claim 15, wherein the updating of the posterior for the elements of the first dataset based on the first intersection includes:
updating posterior for elements of the first sub-dataset based on a ratio of a size of the first intersection and a size of the first sub-dataset.

* * * * *